UNITED STATES PATENT OFFICE.

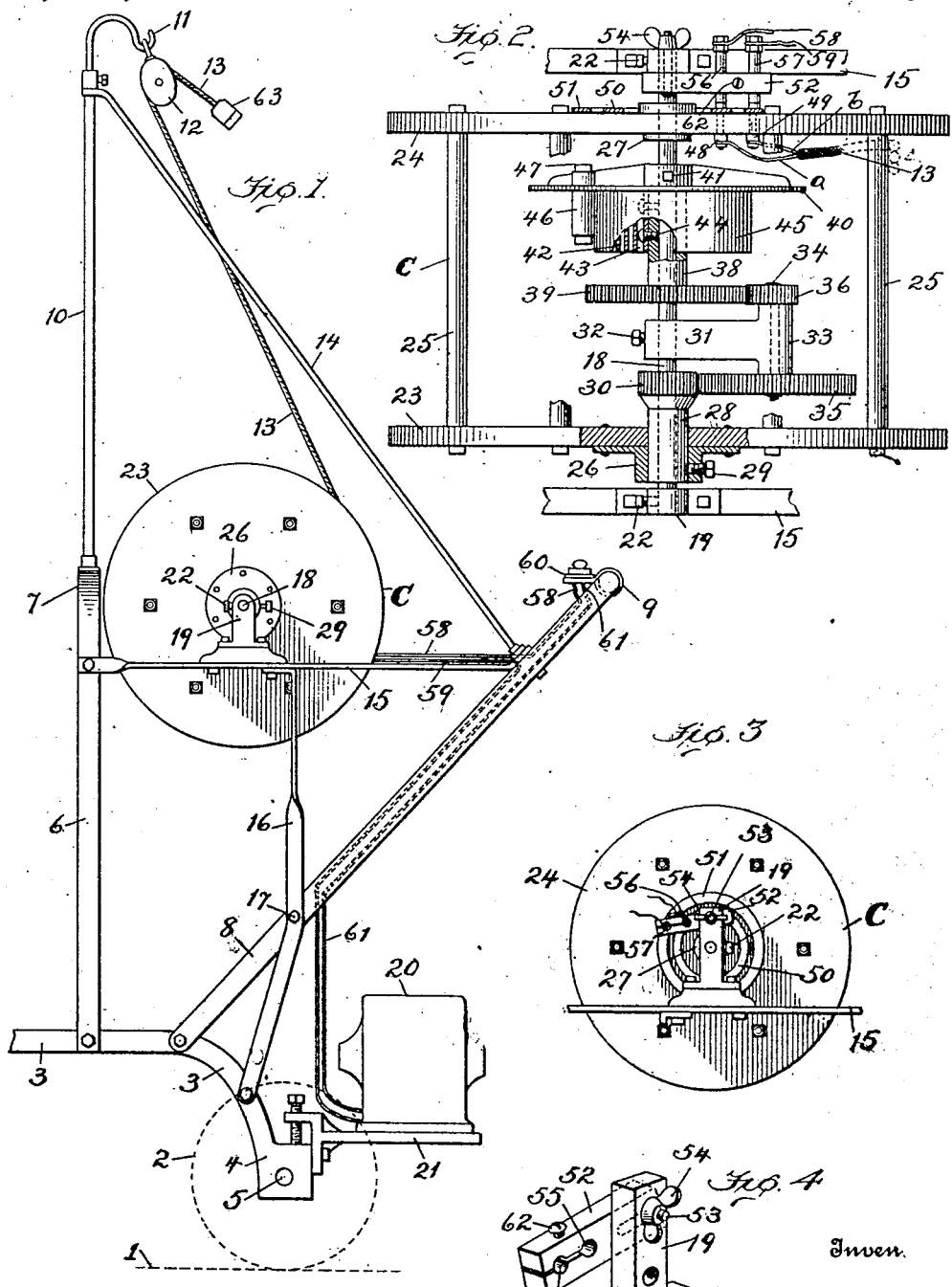

THOMAS R. JENKINS, JR., OF BALTIMORE, MARYLAND, ASSIGNOR OF ONE-HALF TO WALTER S. FINNELL, OF HANNIBAL, MISSOURI, AND ONE-HALF TO FINOLA MANUFACTURING COMPANY, OF HANNIBAL, MISSOURI, A CORPORATION OF MISSOURI.

TRUCK-REEL FOR CONDUCTOR-WIRES.

1,079,299.

Specification of Letters Patent. Patented Nov. 18, 1913.

Application filed September 21, 1912. Serial No. 721,583.

*To all whom it may concern:*

Be it known that I, THOMAS R. JENKINS, Jr., a citizen of the United States, residing at Baltimore, in the State of Maryland, have invented certain new and useful Improvements in Truck-Reels for Conductor-Wires, of which the following is a specification.

This invention relates to a reel for winding the electric conducting wires communicating between a source of current and a motor—both said reel and motor being supported on a frame mounted upon rollers which carry also any desired apparatus to be driven by the motor,—such as a rotary scrubbing machine, a vacuum sweeper or other machine.

The object of this invention is to provide an improved construction of gearing and revoluble reel on which the conducting wires will be automatically wound and unwound as the apparatus moves forward or backward and to combine the same with such apparatus, so as to avoid dragging the wires along the floor.
The invention is illustrated in the accompanying drawing, in which, Figure 1 is a side elevation showing parts of a supporting frame mounted on rollers, a motor, conducting wires, and one side of the reel. Fig. 2 is a top view, on a larger scale, of the reel. Fig. 3 shows the contact side of the reel which side is opposite that seen in Fig. 1. Fig. 4 is a detail view of the wire holder device that makes contact with the reel.

The horizontal line 1, indicates a floor; the circular line, 2, one of the rollers that support the apparatus and which is to move forward and backward on the floor. The frame shown in Fig. 1, illustrates those parts of the frame that are seen at one side only.

The numeral, 3, designates one of the base bars which has a head, 4, provided with a hole, 5, that indicates a bearing to take the axle-rod on which latter the rollers may turn. The vertical bar, 6, has its lower end attached to the base bar, 3, and at its top curves at 7, and extends horizontally across to the opposite side of the apparatus, where a similar vertical bar (not seen) is attached in like manner to the base bar at that side.

At each side of the frame is an upwardly-inclined push-bar, 8, which has its lower end bolted to the base-bar, 3; at the top end of the inclined bar seen in Fig. 1, is a horizontal bar, 9, that connects with the corresponding inclined bar at the opposite side. This horizontal bar, 9, serves as a handle or push-bar, by grasping which an attendant may move the apparatus forward or backward along the floor.

A staff rod, 10, rises vertically from the center of the horizontal bar that extends from the curve, 7, across to the opposite side; at its top end this staff has a hook, 11, to sustain a pulley block, 12, over which passes the cable, 13, inclosing the two conducting wires. A brace rod, 14, has its lower end secured to one of the inclined push bars, 8, and its upper end is secured to the staff, 10, near its top. In practice two such brace rods are or may be used.

A horizontal bar, 15, has one end secured to the vertical bar, 6, and the other end secured to the inclined push bar, 8, and a standard, 16, has an end attached to the base-bar, 3, and therefrom extends upward and is attached by a bolt, 17, to the inclined push bar, and its upper end is secured to the said horizontal bar, 15.
The revoluble reel, C, is supported and turns on a horizontal rod, 18, which latter rests in bearings, 19,—one end of said rod being in such a bearing that seats on each of the two horizontal bars, 15.
It will be seen this construction of frame mounted on rollers constitutes a truck and provides for supporting the reel, C; for sustaining at an elevated position the pulley-block, 12, that holds up the cable and also provides for bracing the structure parts.

A motor, 20, is supported on a bracket, 21; this motor is to drive the mechanism (not shown) whatever it may be; in the present instance the mechanism referred to is intended for scrubbing the floor by the action of rotary brushes, which, however, is no part of the present invention.

The horizontal rod, 18, as already explained, has its ends sustained in the two bearings, 19, which latter are seated on the two horizontal bars, 15, and said rod, 18, is rigidly held in the bearings by means of set bolts, 22. Thus it will be understood that the rod, 18, does not revolve but is fixed.
The reel comprises two circular spaced apart disks, 23, and, 24, respectively which are held in the spaced-apart condition by means of horizontal connecting rods, 25. The disk, 23, of the reel has on its outer side a circular bearing plate, 26, which is provided with a set-bolt, 29; a sleeve, 28, is freely rotatable on the fixed rod, 18, and projects through the said bearing plate; the set-bolt, 29, makes a rigid connection between the bearing plate and said sleeve whereby any rotary motion of the sleeve will be imparted to the bearing plate and said reel-disk, 23. The other reel-disk, 24, has a bushing, 27, that freely turns on the stationary rod, 18.

The inner end of the sleeve, 28, is provided with a pinion, 30, which is rigid with the sleeve but loose with respect to the rod, 18, and for a purpose which will presently be explained.

Near the inner end of the sleeve and at the side of pinion, 30, the rod, 18, carries a horizontal bracket arm, 31, which latter is rigidly secured on the rod by means of a set screw or bolt, 32. The outer end of this bracket has a bearing, 33, through which a horizontal shaft, 34, extends and one end of this shaft carries a gear, 35, which meshes with the pinion, 30, while the other end is provided with a pinion, 36, which meshes with a gear, 39. Beyond the bracket arm, 31, the rod, 18, carries a tubular sleeve, 38, one end of which is attached to said gear, 39, which meshes with and drives the pinion, 36, on the end of the shaft, 34. Both the sleeve, 38, and gear, 39, are loose on the rod, 18, and are therefore free to turn or revolve about said rod.

A circular plate, 40, is rigidly supported on the rod, 18, at the inner side of the reel disk, 24,—a set bolt, 41, serving to hold the plate stationarily on the rod. At one side of this plate, 40, and around the tubular sleeve, 38, there is coiled a spring, 42, the inner end, 43, of which is secured by screws, 44, to the tubular sleeve, 38, and the outer coil, 45, of which has an eye, 46, through which a bolt, 47, passes. This bolt, 47, projects from the stationary circular plate, 40, and has a fixed position because the plate does not revolve.

From the foregoing explanation it will be understood that when the reel is turned in one direction the spring, 42, will be wound and power thus stored, and when the reel is released the spring will act on sleeve, 38, gear, 39, pinion, 36, shaft, 34, gear, 35, pinion, 30, and sleeve, 28, to return the reel to its original or normal position. Thus it will be understood that if the cable, 13, is drawn from the reel, as it would be if the machine were pushed over a floor, the unwinding of the cable from the reel would effect a winding of the spring, 42, so that when the machine is returned over the floor surface, the stored-up power of the spring would cause the reel to again wind the cable on the reel.

By referring to Fig. 2, it will be seen that the cable, 13, has its wires a, b, attached respectively to binding posts, 48, and, 49, which latter extend through the disk, 24, of the reel. The binding post, 48, after extending through the disk has its outer end connected with a ring plate, 50, which is secured against the outer side of the disk, and the post, 49, has its outer end connected with another ring plate, 51, which is also on the outer side of the disk, 24, and encircles the ring plate, 50, as clearly shown in Fig. 3.

The bearing, 19, at the side of reel-disk, 24, carries an arm, 52, of suitable insulating material which is adjustably connected thereto by means of a bolt, 53, and thumb or wing nut, 54. This arm has a slot extending crosswise thereof at its free end whereby to form yielding clamping jaws and each jaw has two spaced-apart semicircular grooves, 55,—each groove of one jaw registering with a like groove in the other jaw, so that two contact brushes, 56, and, 57, respectively may be so carried by the grooves that the inner end of one may have a frictional contact with one ring plate and the inner end of the other have a like contact with the other ring plate on the outer side of the reel-disk, 24. From the brushes, 56, and, 57, two wires, 58, and, 59, extend,—the wire, 58, leading to and connecting one post of a switch, 60, and the wire, 59, leading to and connecting one post of the motor, 20. Another wire, 61, extends between and connects the other posts of the motor and switch.

For convenience in operation the switch, 60, is attached to the cross-bar, 9, which forms the handle of the truck or machine frame where it may be readily manipulated by the operator to start or stop the motor.

A suitable set screw, 62, is provided in the jaws of the arm, 52, whereby to effectually clamp the brushes, 56, and, 57. The pulley block, 12, is so swiveled that it may readily turn in any direction so that the cable may properly travel therethrough.

In practice the end of the conductor wire has an ordinary plug, 63, for attachment to a conventional socket member somewhere in the room or corridor where the machine is to be operated, and the operator need only turn the switch, 60, to set the motor in motion and then wheel the machine or truck over the floor or surface to be scrubbed or otherwise treated. When the machine is pushed away from the point where the conductor is applied to the stationary socket, the reel will unwind the conductor but at the same time will wind the spring, 42,—the gearing being such that no appreciable difference is noticed by the operator as the spring winds. By this means the cable is kept sufficiently taut to keep it off the floor or surface about the machine so it will not interfere with the manipulation of the machine.

Having thus described my invention what I claim and desire to secure by Letters Patent is:—

A truck-reel for winding the conducting wires of a rotary floor-scrubbing machine having in combination, a fixed horizontal rod; a reel on which the conducting wires may be wound—said reel having two disks rotatably mounted on the said rod one of the disks being provided with a sleeve 28 loose around the rod; a stationary vertical plate rigidly supported on said rod between the two disks; a second sleeve loose on the rod; a bracket arm rigidly secured to the said rod intermediate of said two sleeves and said arm projecting and having a shaft-bearing, 33; a spring coiled around the rod and one end of the spring attached to the stationary vertical plate and the other end to the second sleeve; a shaft, 34, supported in the bearing on the projecting bracket arm and carrying gear-wheels; and gear-wheels connecting with the said two sleeves.

In testimony whereof I affix my signature in presence of two witnesses.

THOMAS R. JENKINS, Jr.

Witnesses:
G. FERD. VOGT.
CHARLES B. MANN, Jr.